(12) United States Patent
Fan

(10) Patent No.: US 8,201,782 B2
(45) Date of Patent: Jun. 19, 2012

(54) HEIGHT ADJUSTABLE STAND AND FLAT PANEL DISPLAY UTILIZING THE SAME

(75) Inventor: Gang-Tao Fan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/764,938

(22) Filed: Apr. 21, 2010

(65) Prior Publication Data

US 2010/0320339 A1      Dec. 23, 2010

(30) Foreign Application Priority Data

Jun. 17, 2009   (CN) .......................... 2009 1 0303346

(51) Int. Cl.
- *A47J 47/16* (2006.01)
- *F16M 11/26* (2006.01)
- *E04G 3/00* (2006.01)
- *H05K 5/00* (2006.01)
- *H05K 7/00* (2006.01)
- *G06F 1/16* (2006.01)

(52) U.S. Cl. .................. 248/125.8; 248/132; 248/188.5; 248/920; 248/919; 248/917; 248/292.12; 248/292.13; 248/125.9; 361/679.01; 361/679.02; 361/679.05; 361/679.06

(58) Field of Classification Search .................. 248/132, 248/125.8, 188.5, 920, 919, 133, 125.9, 292.12, 248/292.13, 284.1; 361/681, 679.01–679.02, 361/679.06, 679.05

See application file for complete search history.

(56) References Cited

U.S. PATENT DOCUMENTS

| | | | | |
|---|---|---|---|---|
| 3,214,187 A * | 10/1965 | Fuerst | ........................... | 280/654 |
| 4,621,431 A * | 11/1986 | Fatool et al. | .................... | 33/809 |
| 5,076,580 A * | 12/1991 | Lang | .............................. | 473/417 |
| 5,918,840 A * | 7/1999 | Christensen | ................... | 248/118 |
| 6,918,564 B2 * | 7/2005 | Yen et al. | ...................... | 248/404 |
| 7,036,787 B1 * | 5/2006 | Lin | ................. | 248/676 |
| 7,068,497 B2 * | 6/2006 | Chu | ........................ | 361/679.06 |
| 7,124,984 B2 * | 10/2006 | Yokouchi et al. | .......... | 248/125.8 |
| 7,301,759 B2 * | 11/2007 | Hsiung | .................... | 361/679.27 |
| 7,344,117 B2 * | 3/2008 | She | ............................... | 248/408 |

(Continued)

FOREIGN PATENT DOCUMENTS

TW       M271226       7/2005

(Continued)

*Primary Examiner* — Terrell McKinnon
*Assistant Examiner* — Christopher Garft
(74) *Attorney, Agent, or Firm* — Altis Law Group, Inc.

(57) ABSTRACT

A height adjustable stand comprises a base, a connecting member, a height extender, and a positioning mechanism. The base includes a support member protruding therefrom. The connecting member comprises a first surface and a first end frictionally and rotatably connected to the support member. The height extender is slidably connected to the connecting member and comprises a second surface and an upper connecting end for connecting with a flat panel display device. The positioning mechanism comprises a plurality of recessed portions formed in one of the first surface and the second surface, and a compressed elastic member slidably received in a receiving hole defined in the other one of the first surface and the second surface, one end of the elastic member being biased to be received in one of the plurality of recessed portions to locate the height extender in a desirable position.

10 Claims, 5 Drawing Sheets

U.S. PATENT DOCUMENTS

| | | | | |
|---|---|---|---|---|
| 7,413,150 B1* | 8/2008 | Hsu | | 248/123.11 |
| 7,694,919 B2* | 4/2010 | Lee | | 248/123.11 |
| 7,706,138 B2* | 4/2010 | Lee | | 361/679.21 |
| 2006/0214081 A1* | 9/2006 | Fang | | 248/581 |
| 2008/0023599 A1* | 1/2008 | Lin | | 248/122.1 |
| 2008/0142659 A1* | 6/2008 | Sun | | 248/226.11 |

FOREIGN PATENT DOCUMENTS

| TW | M306376 | 2/2007 |
|---|---|---|
| TW | I281573 | 5/2007 |

* cited by examiner

HEIGHT ADJUSTABLE STAND AND FLAT PANEL DISPLAY UTILIZING THE SAME

BACKGROUND

1. Technical Field

The present disclosure relates to stands used in flat panel display device, and more particularly, to a height adjustable stand for an LCD display device.

2. Description of Related Art

Generally, flat panel display devices such as LCD displays are often mounted on a stand that allows rotation of the display and adjustment of the height of the display area relative to the desktop. Typically, the stands use a spring or coil-type mechanism to control the height position of the display, where the spring or coil-type mechanism is designed to offset the weight of the display so that the display can be placed at a desired height when the stand and display are resting on a horizontal surface, such as a desktop. However, one difficulty that often arises with movement of a display stand is that the spring or coil-type mechanism in the stand causes the stand to open or extend to its full height or length. This can make handling of a display awkward and unwieldy. In addition, the extended height position can add additional expense and complications when shipping or moving a display.

Therefore, what is needed is an adjustable stand that can be used to adjust the LCD display to a desirable height according to need.

BRIEF DESCRIPTION OF THE DRAWINGS

The components in the drawings are not necessarily drawn to scale, the emphasis instead being placed upon clearly illustrating the principles of the height adjustable stand. Moreover, in the drawings, like reference numerals designate corresponding parts throughout the several views.

DETAILED DESCRIPTION

Figure 1:
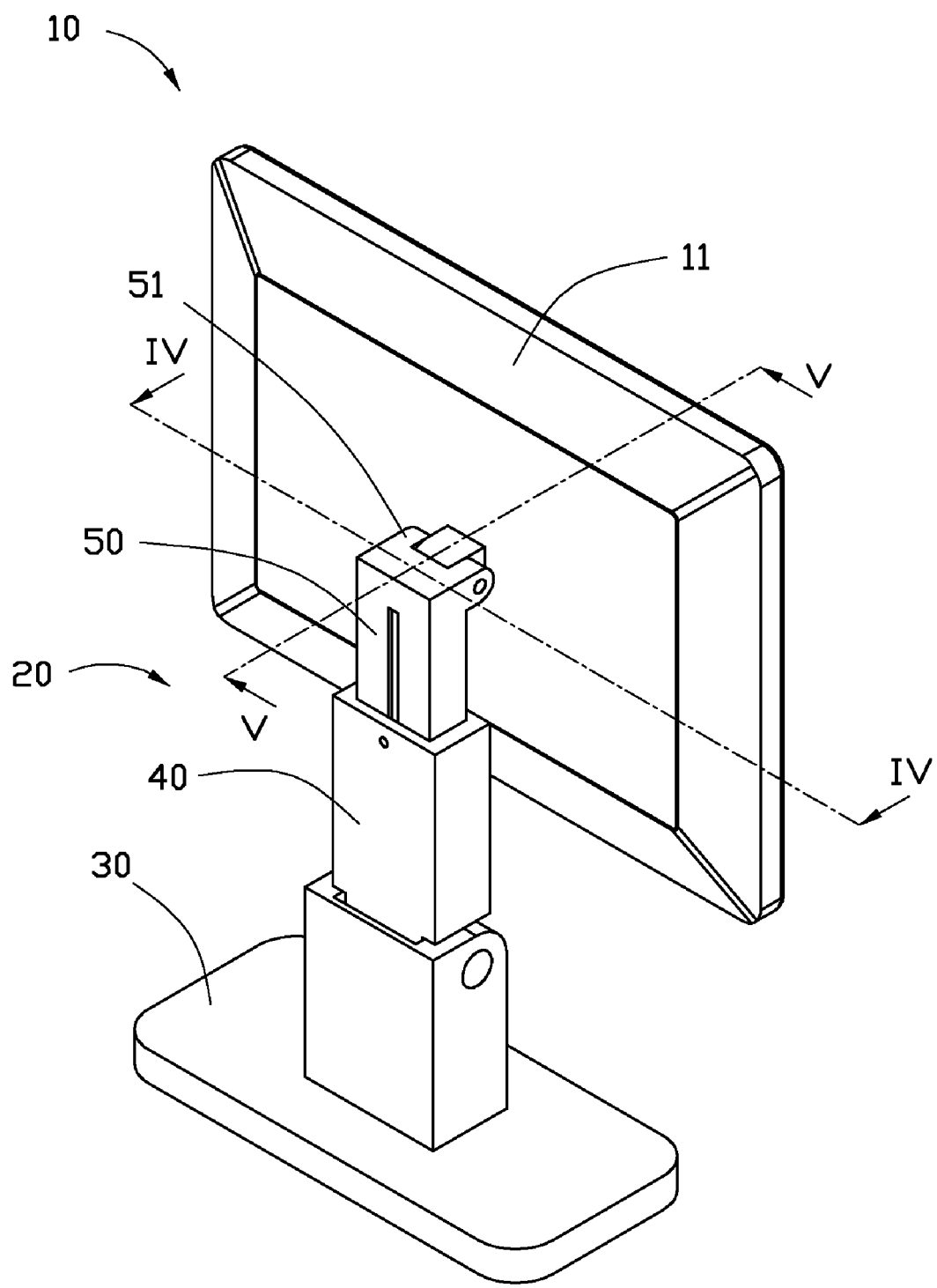
FIG. 1 is an isometric view of an LCD display having a height adjustable stand in accordance with an exemplary embodiment.
Figure 2:
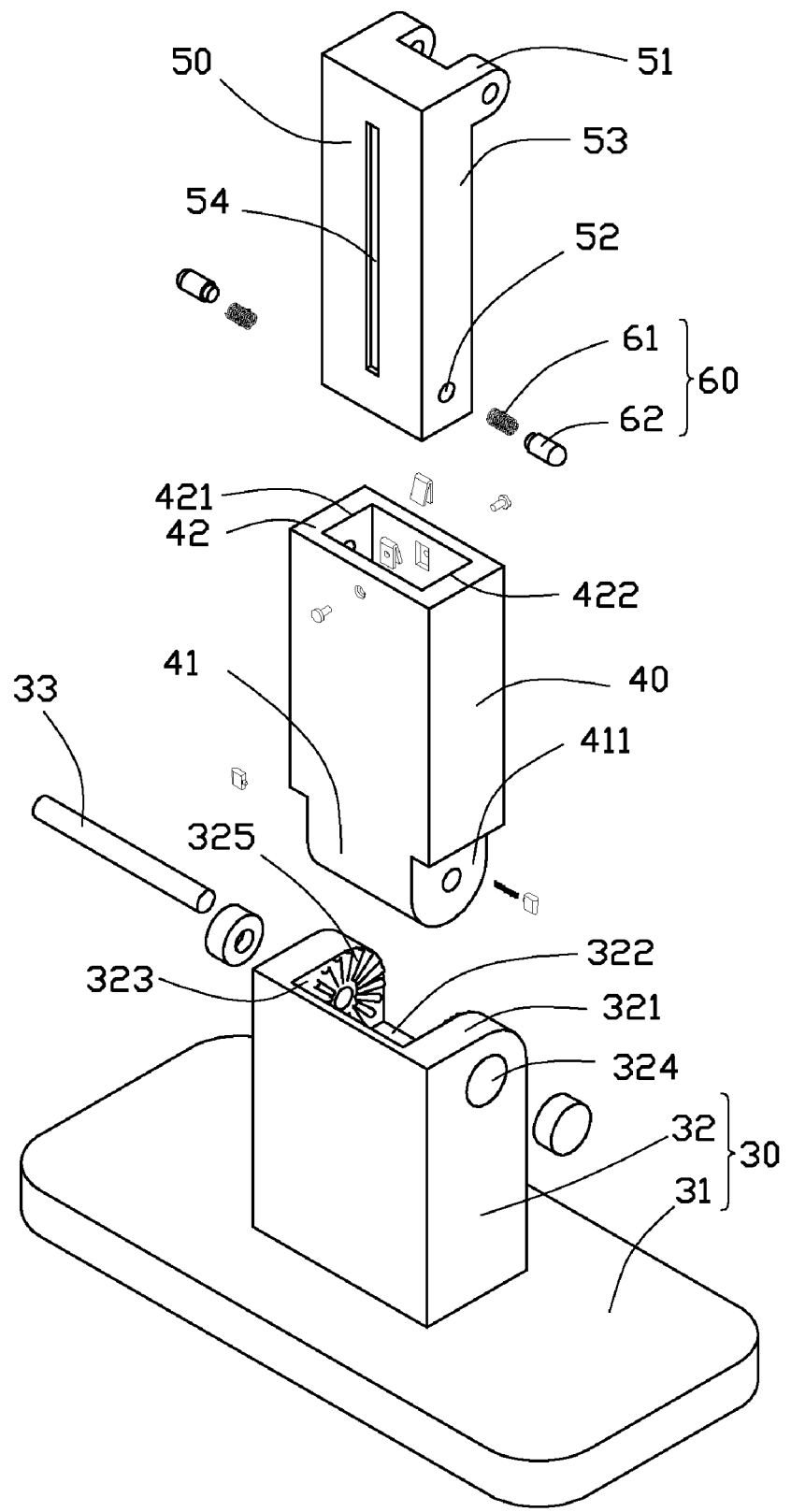
FIG. 2 is an exploded view of the stand of FIG. 1.
Figure 3:
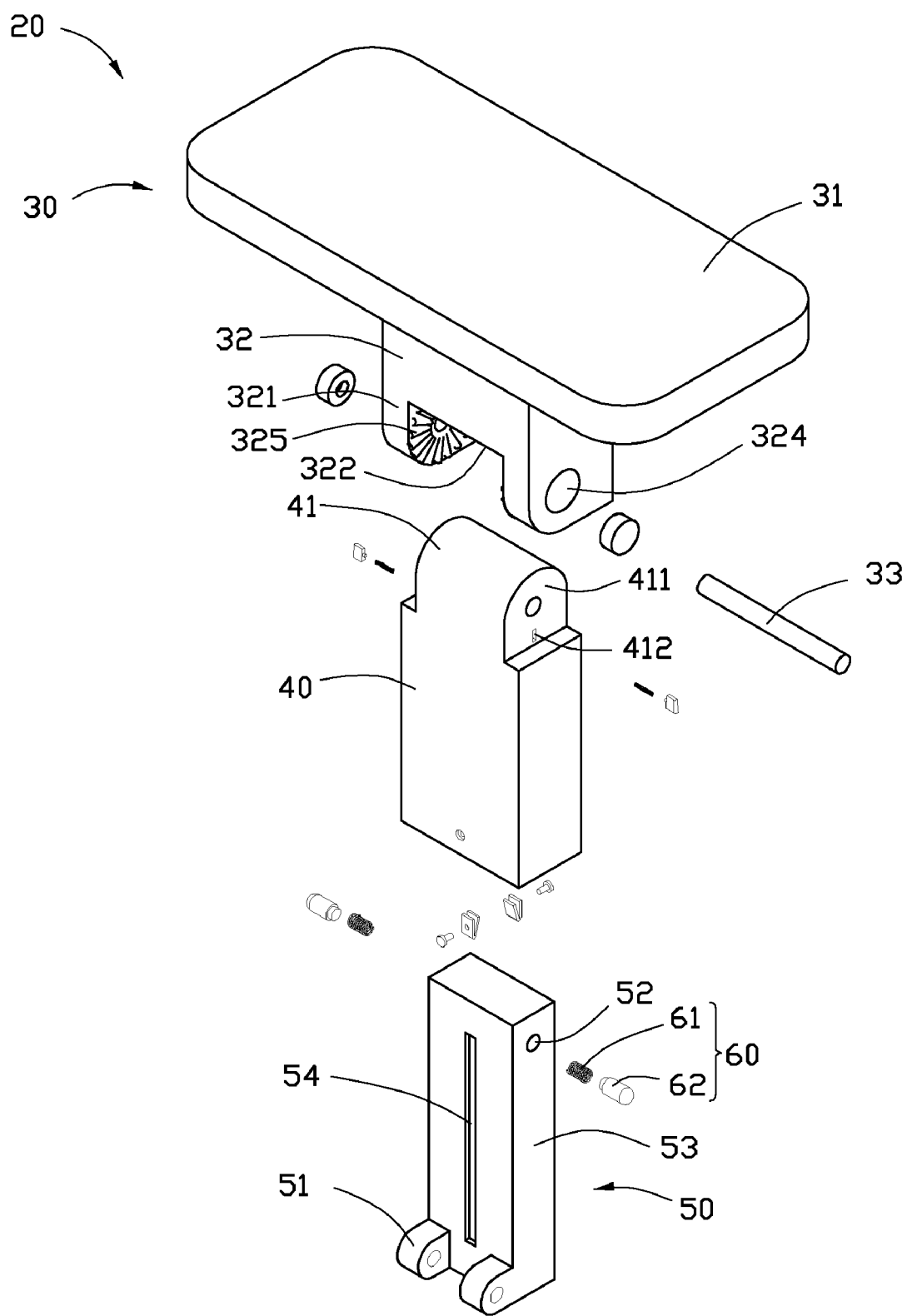
FIG. 3 is another exploded view of the stand of FIG. 1 viewed from another perspective.

Referring to FIGS. 1-3, an LCD display 10 includes a display housing 11 and a stand 20 for supporting the display 10. The stand 20 includes a base 30, a connecting member 40, and a height extender 50. The display housing 11 is rotatably connected to an end 51 of the height extender 50. The base 30 includes a seat 31 and a support member 32 protruding from the seat 31. The support member 32 includes two support walls 321 protruding from an upper end 322. The support walls 321 are spaced from each other. Two opposite inner surfaces 323 of the support walls 321 each defines a receiving hole 324 to receive an axle 33, through which the connecting member 40 is rotatably connected to the support member 32.

The connecting member 40 includes a first end 41 rotatably connected to the support member 32. Two side surfaces 411 of the first end 41 each stays contact with one of the inner surfaces 323 of the support walls 321, such that sufficient friction between the first end 41 and the support walls 321 can be created, which constitutes a frictional positioning structure to position the connecting member 40. In another embodiment, the sufficient friction may be created between the axle 33 and the first end 41 to make such frictional positioning structure.

Figure 4:
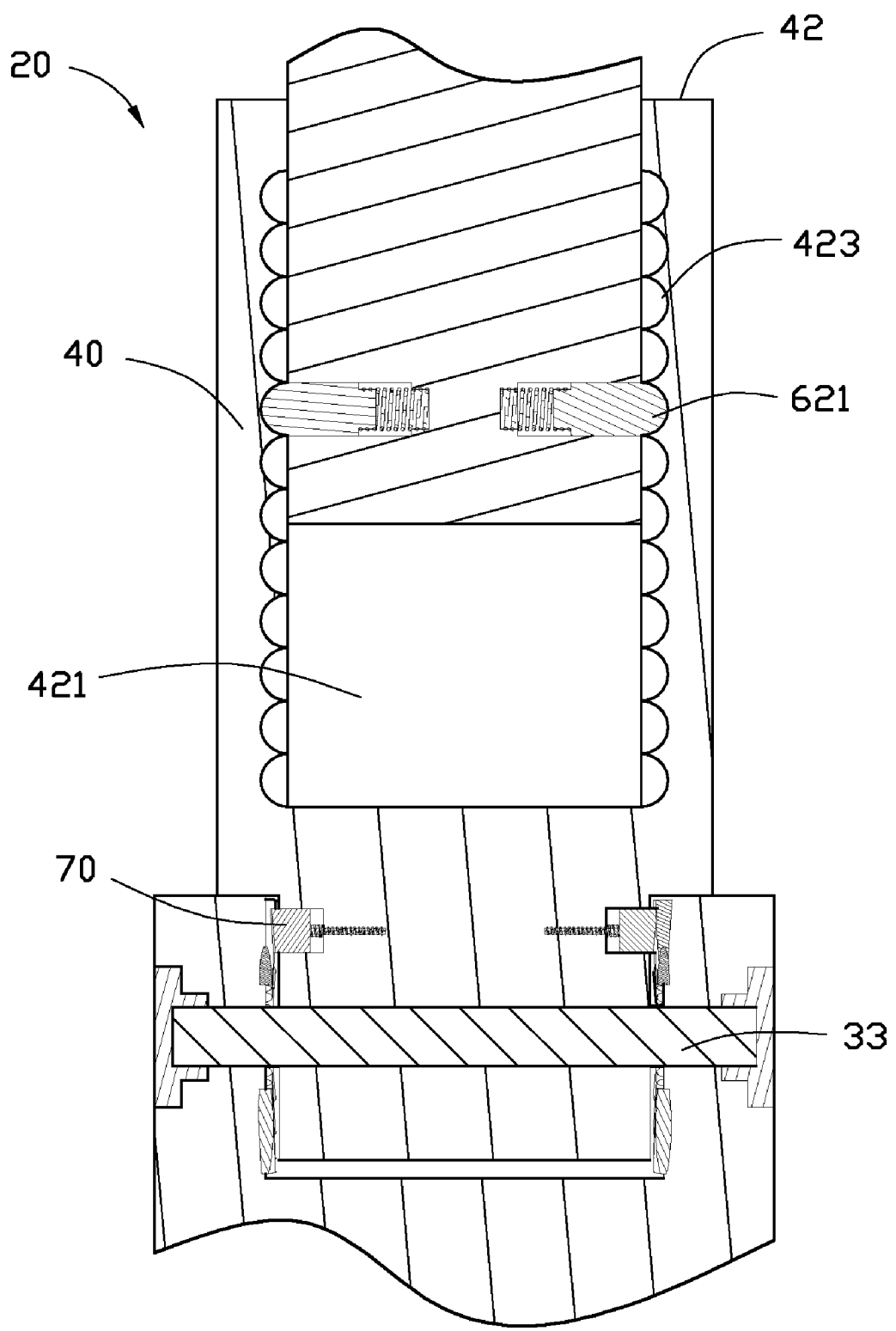
FIG. 4 is a cross-sectional view of the stand of FIG. 1, which is taken from the line IV-IV of FIG. 1.
Figure 5:
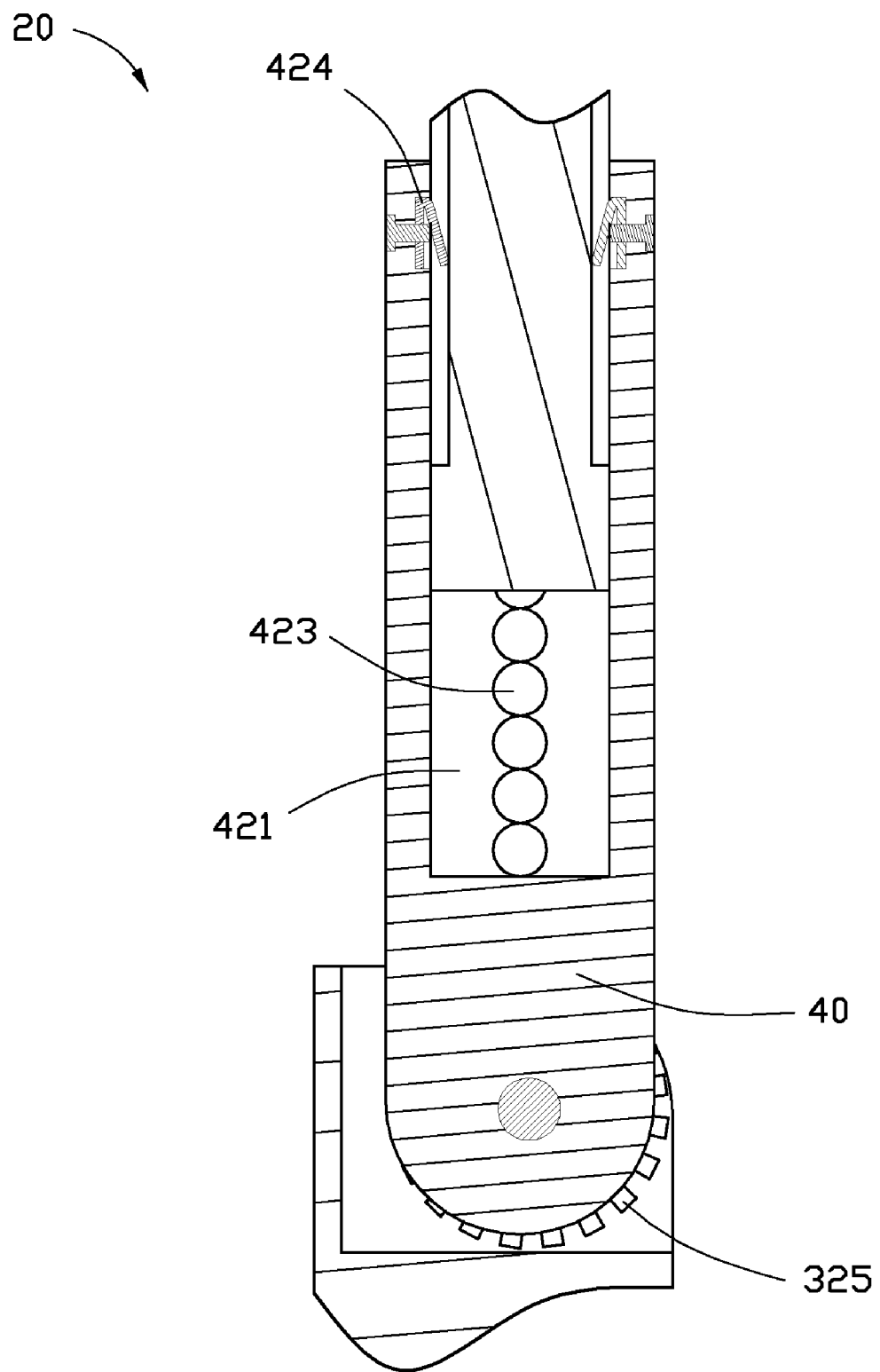
FIG. 5 is another cross-sectional view of the stand of FIG. 1, which is taken from the line V-V of FIG. 1.

Referring to FIGS. 4-5, the connecting member 40 also includes a second end 42 defining a receiving space 421. The receiving space 421 extends along a length direction of the connecting member 40 and is shaped to receive the height extender 50. Two inner surfaces 422 of the receiving space 421 each defines a set of recessed portions 423. The recessed portions 423 are arranged in a straight line along the length direction of the connecting member 40. In the embodiment, the recessed portions 423 are half-spherical cavities.

The stand 20 also includes at least one elastic member 60 received in a receiving hole 52 formed in an side surface 53 of the height extender 50. In the embodiment, the elastic member 60 includes a coil spring 61 compressed in the receiving hole 52, and a rod 62 fixed to an end of the spring 61. The rod 62 is biased by the spring 61, which causes an end 621 of the rod 62 is received in one of the half-spherical cavities 423. The height extender 50 is slidably connected to the connecting member 40.

To adjust the height of the display 10, the height extender 50 is caused to move with respect to the connecting member 40. The sliding movement of the height extender 50 causes the rod 62 to move inward, which allows the end 621 of the rod 62 to move from one half-spherical cavity 423 to another. When a desirable height is obtained, the height extender 50 is stopped and the end 621 is received in a certain cavity 423, which locates the display 10 in the desirable position.

To prevent the height extender 50 from disengaging from the connecting member 40, the connecting member 40 also includes at least one stopper 424 protruding from the inner surface 422. The stopper 424 is received in a groove 54 formed in a front surface of the height extender 50. The groove 54 is formed along the sliding direction of the height extender 50. When the stopper 424 engages an upper or lower edge of the groove 54, the sliding of the height extender 50 is stopped.

In another embodiment, the inner surfaces 323 of the support wall 321 may define a plurality of slots 325 arranged radially around the axle 33. Each side surface 411 of the first end 41 may define an aperture 412. A resilient member 70 is compressed and received in the aperture 412. One end of the resilient member 70 is received in the one of the slots 325. A rotation of the connecting member 40 causes the resilient member 70 to move inward, which allows the end to move from one slot 325 to another. A second positioning structure is thus constituted. The connecting member 40 may be positioned by the first and second positioning structure, alone or in combination.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A height adjustable stand comprising:
   a base comprising a support member protruding therefrom;
   a connecting member comprising a first surface and a first end frictionally and rotatably connected to the support member;
   a height extender slidably connected to the connecting member comprising a second surface and an upper connecting end for connecting with a flat panel display device; and
   a positioning mechanism comprising a plurality of recessed portions formed in one of the first surface and the second surface, and a compressed elastic member slidably received in a receiving hole defined in the other one of the first surface and the second surface, one end of the elastic member being biased to be received in one of the plurality of recessed portions to locate the height extender in a desirable position, wherein a sliding movement of the height extender causes the end of the elastic member to move inward, which allows the end of the elastic member to move from one of the recessed portions to another one;

wherein the connecting member further comprises a second end defining a receiving space, the height extender is received in the receiving space, the height extender defines a groove extending along a sliding direction of the sliding movement, the connecting member comprises a stopper protruding from and being inclined relative to the inner surface of the receiving space, the stopper is capable of engaging an end of the groove to stop the sliding movement of the height extender;

a plurality of slots are formed in an inner side surface of the support wall and arranged radially around the axle, a side surface of the first end defines an aperture to movably receive the resilient member, one end of the resilient member is received in one of the plurality of slots, each slot is defined by two protruding ridges, and each ridge has a curved cross section.

2. The stand according to claim 1, further comprising an axle, wherein the support member comprises two support walls opposite to and spaced from each other, the first end comprises two side surfaces each frictionally engaging one of the two support walls, the axle is configured for rotatably connecting the first end to the support walls.

3. The stand according to claim 1, wherein the elastic member comprises a coil spring retained within the receiving hole and a rod connected to the coil spring, the rod is biased by the coil spring, which causes one end of the rod is received in one of the recessed portions.

4. The stand according to claim 1, wherein the plurality of recessed portions are formed in an inner surface of the receiving space, the receiving hole is defined in an outer surface of the height extender.

5. A flat panel display device comprising:
a display housing; and
a stand comprising:
a base comprising a support member protruding therefrom;
a connecting member comprising a first surface and a first end frictionally and rotatably connected to the support member; and
a height extender slidably connected to the connecting member comprising a second surface and an upper connecting end for connecting with the display housing; and
a positioning mechanism comprising a plurality of recessed portions formed in one of the first surface and the second surface, and a compressed elastic member slidably received in a receiving hole defined in the other one of the first surface and the second surface, one end of the elastic member being biased to be received in one of the plurality of recessed portions to locate the height extender in a desirable position, wherein a sliding movement of the height extender causes the end of the elastic member to move inward, which allows the end of the elastic member to move from one of the recessed portions to another one;
wherein the connecting member further comprises a second end defining a receiving space, the height extender is received in the receiving space, the height extender defines a groove extending along a sliding direction of the sliding movement, the connecting member comprises a stopper protruding from and being inclined relative to the inner surface of the receiving space, the stopper is capable of engaging an end of the groove to stop the sliding movement of the height extender;
a plurality of slots are formed in an inner side surface of the support wall and arranged radially around the axle, a side surface of the first end defines an aperture to movably receive the resilient member, one end of the resilient member is received in one of the plurality of slots, each slot is defined by two protruding ridges, and each ridge has a curved cross section.

6. The display device according to claim 5, further comprising an axle, wherein the support member comprises two support walls opposite to and spaced from each other, the first end comprises two side surfaces each frictionally engaging one of the two support walls, the axle is configured for rotatably connecting the first end to the support walls.

7. The display device according to claim 5, wherein the elastic member comprises a coil spring retained within the receiving hole and a rod connected to the coil spring, the rod is biased by the coil spring, which causes that one end of the rod is received in one of the recessed portions.

8. The display device according to claim 5, wherein the plurality of recessed portions are formed in an inner surface of the receiving space, the receiving hole is defined in an outer surface of the height extender.

9. An LCD display device comprising:
a display housing; and
a stand comprising:
a base comprising two support walls, at lease one of the two support walls comprising an inner surface defining a plurality of slots extending radially, each slot is defined by two protruding ridges, and each ridge has a curved cross section;
a connecting member comprising a first end rotatably connected to the two support walls and a second end defining a receiving space, the first end defining an aperture opposite the plurality of slots of the two support walls, the receiving space comprising an inner surface defining a plurality of recessed portions;
a resilient member moveably received in the aperture and comprising an end received in one of the plurality of slots;
a height extender slidably received in the receiving space, the height extender comprising an outer surface defining a receiving hole opposite to the plurality of recessed portions; and
an elastic member movably received in the receiving hole of the height extender and comprising an end received in one of the plurality of recessed portions;
wherein the height extender defines a groove extending along a sliding direction, the connecting member comprises a stopper protruding from and being inclined relative to the inner surface of the receiving space, the stopper is capable of engaging an end of the groove to prevent the height extender from moving along the sliding direction.

10. The LCD display device according to claim 9, wherein the elastic member comprises a coil spring retained within the receiving hole and a rod connected to the coil spring, the rod is biased by the coil spring, which causes that one end of the rod is received in one of the recessed portions.

* * * * *